US012775694B2

(12) United States Patent
Nassar et al.

(10) Patent No.: US 12,775,694 B2
(45) Date of Patent: Oct. 27, 2026

(54) CHARACTER ENTRY PAUSE TIME FOR PASSWORDS

(71) Applicant: Adobe Inc., San Jose, CA (US)

(72) Inventors: Nader Nassar, Yorktown Heights, NY (US); John A. Trammel, Bothell, WA (US); Christian Elgart, Boulder, CO (US)

(73) Assignee: Adobe Inc., San Jose, CA (US)

( * ) Notice: Subject to any disclaimer, the term of this patent is extended or adjusted under 35 U.S.C. 154(b) by 148 days.

(21) Appl. No.: 18/954,375

(22) Filed: Nov. 20, 2024

(65) Prior Publication Data

US 2026/0141050 A1 May 21, 2026

(51) Int. Cl.
*G06F 21/46* (2013.01)
*G06F 21/31* (2013.01)
*G06F 18/22* (2023.01)

(52) U.S. Cl.
CPC .............. *G06F 21/46* (2013.01); *G06F 21/31* (2013.01); *G06F 18/22* (2023.01)

(58) Field of Classification Search
CPC ........ G06F 21/31; G06F 21/46; G06F 21/316; H04L 9/0863
See application file for complete search history.

(56) References Cited

U.S. PATENT DOCUMENTS 5,682,475 A * 10/1997 Johnson ................... G07C 9/33 726/18
6,895,514 B1 * 5/2005 Kermani ............... G06F 21/316 726/19
7,653,818 B2 * 1/2010 Serpa ...................... G06F 21/31 713/184
11,003,762 B2 * 5/2021 McIntosh ................ G06F 21/46
2002/0147930 A1 * 10/2002 Pritchard ................ G06F 21/31 726/5

(Continued)

FOREIGN PATENT DOCUMENTS

CN 111046374 A * 4/2020 ....... G06F 18/24323
CN 114021086 A * 2/2022 ............ G06F 18/22

(Continued)

OTHER PUBLICATIONS

W. Zheng and C. Jia, "CombinedPWD: A New Password Authentication Mechanism Using Separators Between Keystrokes," 2017 13th International Conference on Computational Intelligence and Security (CIS), Hong Kong, China, 2017, pp. 557-560 (Year: 2017).*

*Primary Examiner* — Zhimei Zhu
(74) *Attorney, Agent, or Firm* — FIG. 1 Patents

(57) ABSTRACT

In implementation of techniques for character entry pause time for passwords, a computing device implements a character entry pause system to present a user interface configured for password creation, the user interface including a plurality of options that are selectable via the user interface to set a corresponding pause time from a plurality of pause times between entry of characters of a password. The character entry pause system receives a first character of the password, a second character of the password, and a selected pause time from the plurality of options. The character entry pause system then stores the password including the selected pause time specified to occur between entry of the first character and the second character.

20 Claims, 10 Drawing Sheets

(56) References Cited

U.S. PATENT DOCUMENTS

| | | | | |
|---|---|---|---|---|
| 2004/0054929 | A1 * | 3/2004 | Serpa | G06F 21/31 726/5 |
| 2004/0143767 | A1 * | 7/2004 | Schreiber | G06F 21/316 726/16 |
| 2005/0273624 | A1 * | 12/2005 | Serpa | G06F 21/31 713/185 |
| 2006/0070125 | A1 * | 3/2006 | Pritchard | H04L 63/0846 726/18 |
| 2006/0280339 | A1 * | 12/2006 | Cho | G07C 9/37 382/115 |
| 2007/0150743 | A1 * | 6/2007 | Weatherford | G06F 21/606 713/184 |
| 2008/0301776 | A1 * | 12/2008 | Weatherford | H04L 63/18 726/3 |
| 2010/0299746 | A1 * | 11/2010 | Shu | G06F 21/31 726/18 |
| 2013/0055381 | A1 * | 2/2013 | Hao | G06F 21/32 726/18 |
| 2015/0193608 | A1 * | 7/2015 | Limberg | G06F 21/31 726/7 |
| 2017/0163625 | A1 * | 6/2017 | Brown | G06F 21/316 |
| 2018/0097794 | A1 * | 4/2018 | Brown | G06F 21/316 |
| 2018/0218142 | A1 * | 8/2018 | Wang | G06F 3/023 |
| 2019/0332748 | A1 * | 10/2019 | Giatilis | G06F 21/31 |
| 2019/0332749 | A1 * | 10/2019 | Giatilis | G06F 21/31 |
| 2020/0151322 | A1 * | 5/2020 | Hassan | G06F 21/31 |
| 2020/0228515 | A1 * | 7/2020 | Hassan | H04L 9/3226 |
| 2020/0272729 | A1 * | 8/2020 | Regen | G06F 21/31 |
| 2021/0064737 | A1 * | 3/2021 | Streuter | G06F 21/46 |

FOREIGN PATENT DOCUMENTS

| | | | | |
|---|---|---|---|---|
| CN | 118862033 | A * | 10/2024 | G06N 3/044 |
| EP | 1469372 | A2 * | 10/2004 | G06F 21/31 |

* cited by examiner

CHARACTER ENTRY PAUSE TIME FOR PASSWORDS

BACKGROUND

Passwords are alphanumeric codes or phrases used to authenticate a user's identity and grant access to secure systems, accounts, or information. Typically, passwords are created by users during an account setup and involve a sequence of letters, numbers, special characters, or other glyphs to enhance security. Generating a password involves hashing the password, converting the password into an unreadable format for storage, and then comparing the password with the hashed entry during login attempts. However, passwords are discoverable by third parties, which presents serious security concerns. Some passwords are integrated with multi-factor authentication to increase security, involving different types of information or credentials to authenticate a user, but also resulting in computational inefficiencies and increased power consumption in real world scenarios.

SUMMARY

Techniques and systems for character entry pause time for passwords are described. In an example, a character entry pause system presents a user interface configured for password creation, the user interface including a plurality of options that are selectable via the user interface to set a corresponding pause time from a plurality of pause times between entry of characters of a password. In some examples, the plurality of pause times indicate consecutive ranges of pause times between the entry of the characters of the password.

The character entry pause system receives a first character of the password, a second character of the password, and a selected pause time from the plurality of options. In some examples, the selected pause time corresponds to a range of time. The selected pause time indicates an amount of time between actuation times of keys on a keyboard. In some examples, the selected pause time includes a time buffer for authentication of the password including the selected pause time.

The character entry pause system then stores the password including the selected pause time specified to occur between entry of the first character and the second character. The password, for instance, is a coded sequence indicating the selected pause time specified to occur between the entry of the first character and the second character. By comparing a first character, a second character, and a pause time between entry of the first character and the second character to the stored password, the character entry pause system verifies a password entry using a machine learning model.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
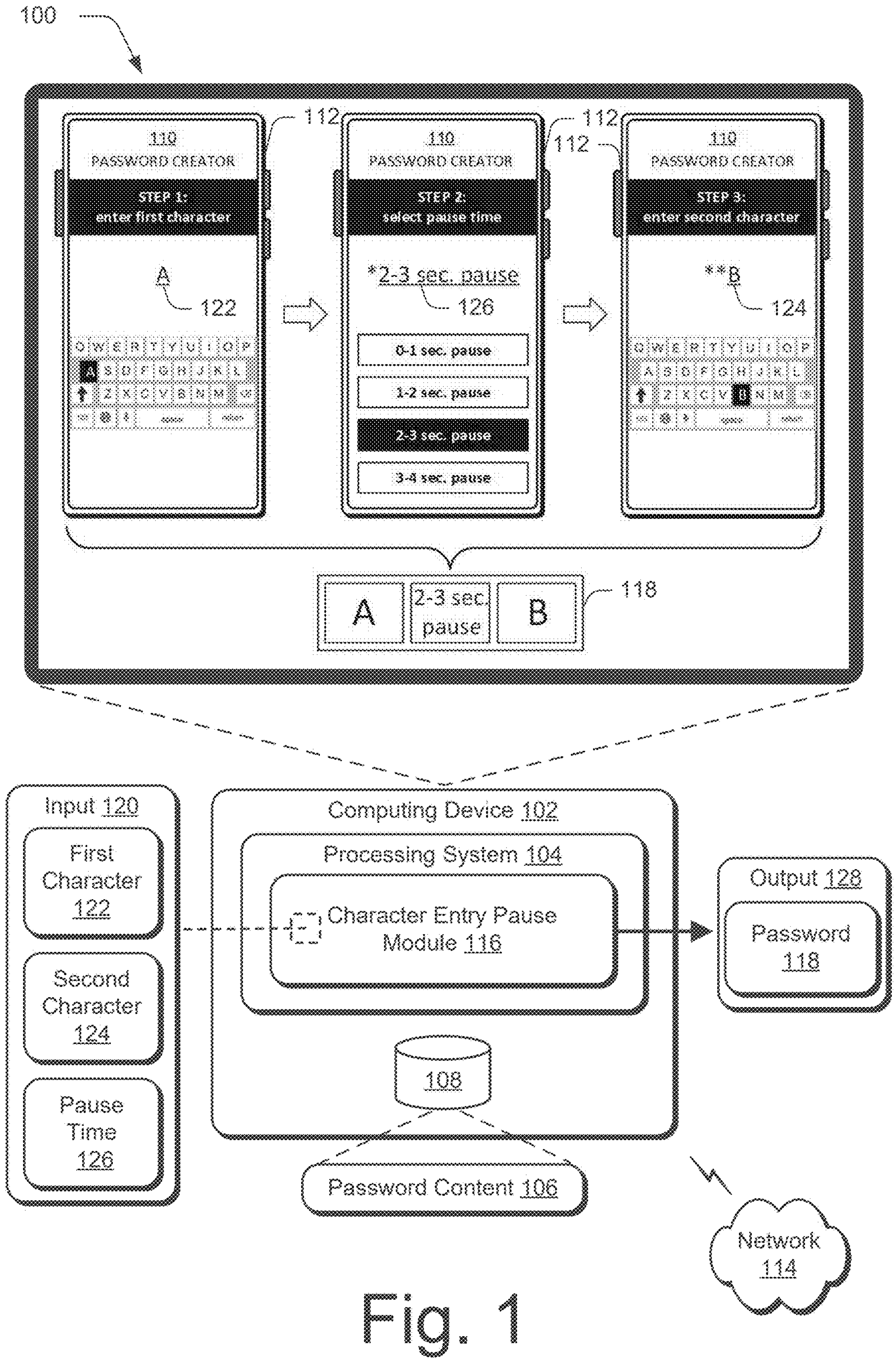
FIG. 1 is an illustration of a digital medium environment in an example implementation that is operable to employ techniques and systems for character entry pause time for passwords as described herein.

Passwords are strings of characters used to authenticate a user's identity and grant access to secure content, including digital devices, systems, or accounts. Conventional password creation and verification techniques involve hashing a password by converting the password into a fixed-length string of characters for storage. Login attempts including a hashed entry are then compared to the password to verify that a user has authorization to access the secure content. Conventional passwords include alphanumeric codes or phrases, which have a limited level of security because anybody who knows the password has access to the secure content. Conventional password techniques including multi-factor authentication attempt to increase password security by requesting the user to supplement a login with additional information, including a code sent to a mobile device associated with the user or answers to questions verifying the user's identity. However, these conventional password techniques are time consuming and utilize additional resources involved in sending a receiving different types of data.

Techniques and systems are described for character entry pause time for passwords that overcome these limitations. A character entry pause system begins in this example by receiving entry of a first character and a second character to create a password. To increase a level of complexity of the password, the character entry pause system incorporates pause times between entry of characters into the password. To do this, the character entry pause system presents multiple selectable options for character entry pause times in a user interface. For instance, the user interface features options for a one second pause time, a two second pause time, or a three second pause time. In some examples, the pause times are ranges of times, for example a 1-2 second pause time. The character entry pause system then receives an entry including a pause time corresponding to a time between entry of the first character and the second character of a password from the options presented in the user interface. Alternatively, the character entry pause system uses a machine learning model to determine pause times between entry of characters absent manual selection of pause times between entry of the characters.

The character entry pause system then generates and stores the password including a sequence of the first character, the pause time, and the second character. The password includes the pause time encoded as a representation of a discrete time or a range of time. In some examples, the password includes a combination of multiple characters and multiple pause times to further increase password complexity. For example, a password of "P," 2 second pause, "A," 1 second pause, "S," 3 second pause, "S," 2 second pause "W," 2 second pause "O," 2 second pause "R," 1 second pause "D" is stronger than a conventional password "PASSWORD" that does not include pause times. This is because password strength is measured by an entropy value, which is based on a number of possible guesses to determine a password. An eight-character password without times pauses has an entropy value of 52.44, while an eight-character password with pause times has an entropy value of 66.37, indicating that adding pause times to a password increases strength of the password.

During password verification, the character entry pause system determines pause times between entry characters of a login attempt. The character entry pause system then compares an entry sequence of the login attempt, including the pause times between the entry characters, to the password. In some examples, the password indicates a time buffer for the pause times to account for imprecision of human entry. For example, the password allows for deviations from the pause times of ±0.5 seconds.

In some examples, the character entry pause system leverages a machine learning model to identify suspicious entries. Because keystroke speed is a unique behavior, the machine learning model is trained on pause times between previous character entries by a user. The character entry pause system then uses the machine learning model to determine whether subsequent entries to the user's device or accounts were made by the user by comparing pause times in the subsequent entries to the previous pause times by the user. In response, the character entry pause system generates user alerts indicating, for example, that pause times that are shorter than the previous pause times indicate the entry was made by an internet bot, or that pause times that are longer than the previous pause times indicate the entry was made by a third party attempting to replicate the user's password or other personal information.

Incorporating character entry pause time in passwords in this manner overcomes the disadvantages of conventional password creation and verification techniques that are limited to strings of alphanumeric characters. For example, character entry pause time adds an additional layer of security to existing alphanumeric passwords by increasing password complexity. Character entry pause time for passwords also offers a replacement for cumbersome multi-factor authentication because incorporating character entry pause time increases security of passwords. As such, the user merely enters the password including the pause times between characters and is not further prompted for additional information or codes. This saves the user time and conserves computing resources. For these reasons, incorporating character entry pause time in passwords is faster, more secure, and less resource-intensive than conventional password techniques.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques and systems for character entry pause time for passwords described herein. The illustrated digital medium environment 100 includes a computing device 102, which is configurable in a variety of ways.

The computing device 102, for instance, is configurable as a desktop computer, a laptop computer, a mobile device (e.g., assuming a handheld configuration such as a tablet or mobile phone), an augmented reality device, and so forth. Thus, the computing device 102 ranges from full resource devices with substantial memory and processor resources (e.g., personal computers, game consoles) to a low-resource device with limited memory and/or processing resources, e.g., mobile devices. Additionally, although a single computing device 102 is shown, the computing device 102 is also representative of a plurality of different devices, such as multiple servers utilized by a business to perform operations "over the cloud" as described in FIG. 10.

The computing device 102 also includes a processing system 104. The processing system 104 is implemented at least partially in hardware of the computing device 102 to process and represent password content 106, which is illustrated as maintained in storage 108 of the computing device 102. Such processing includes creation of the password content 106, representation of the password content 106, modification of the password content 106, and rendering of digital content related to the password content 106 for display in a user interface 110 for output, e.g., by a display device 112. Although illustrated as implemented locally at the computing device 102, functionality of the processing system 104 is also configurable entirely or partially via functionality available via the network 114, such as part of a web service or "in the cloud."

The computing device 102 also includes a character entry pause module 116 which is illustrated as incorporated by the processing system 104 to process the password content 106. In some examples, the character entry pause module 116 is separate from the processing system 104 such as in an example in which the character entry pause module 116 is available via the network 114.

The character entry pause module 116 is configured to generate a password 118 and/or to authenticate the password 118. To begin, the character entry pause module 116 presents a plurality of options in the user interface 110 that are selectable to set a first character 122 for the password 118, a second character 124 for the password 118, and a pause time 126 between entry of characters of the password 118. The plurality of options in this example include selectable options including a 0-1 second pause, a 1-2 second pause, a 2-3 second pause, and a 3-4 second pause. In other examples, the plurality of options include other user interface 110 features configured to receive selection of the pause time 126, including a drop-down list of consecutive ranges of pause times, check boxes for selecting individual or multiple pause times, or a custom field entry box.

The character entry pause module 116 receives an input 120 including an entry of a first character 122 and a second character 124. The first character 122 and the second character 124 represent letters, numbers, or other glyphs selected by a user from an analog keyboard or a digital keyboard. The input 120 in this example also includes an entry indicating the characters "A," "B," and the pause time 126 for the password 118, which includes the selected 2-3 second pause. The pause time 126 takes place between the entry of the first character 122 and the second character 124. For example, the first character 122 is received via a keyboard associated with the computing device 102, followed by the pause time 126, followed by the second character 124. The pause time 126, for example, results from an intentional or unintentional pause in time between actuation of keys or buttons of the keyboard.

In some examples, the character entry pause module 116 determines the pause time 126 based on entry times for the first character 122 and the second character 124. For instance, the character entry pause module 116 also receives a first timestamp that corresponds to entry of the first character 122 and a second timestamp that corresponds to entry of the second character 124. The character entry pause module 116 compares the first timestamp and the second timestamp to determine the pause time 126, which indicates a length of time between the first timestamp and the second timestamp. For example, the pause time 126 corresponds to the second timestamp subtracted by the first timestamp.

The character entry pause module 116 then generates an output 128 including the password 118, which used to authenticate a user's identity to gain access to a resource of the computing device 102. For instance, the password 118 specifies a sequence including the first character 122, the pause time 126, and the second character 124. The pause time 126 specifies an amount of time specified to occur between the entry of the first character 122 and the second character 124, which results in a heightened level of security compared to a sequence of characters without the pause time 126. In this example, the password 118 includes the character "A", followed by a 2-3 second pause, followed by the character "B." To authenticate the password 118, the character entry pause module 116 determines whether a subsequent entry of the first character 122 and the second character 124 is separated by a period of time that is within a threshold range of the pause time 126. Based on the authentication of the password 118, the character entry pause module 116 permits access to the resource of the computing device 102.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Figure 2:
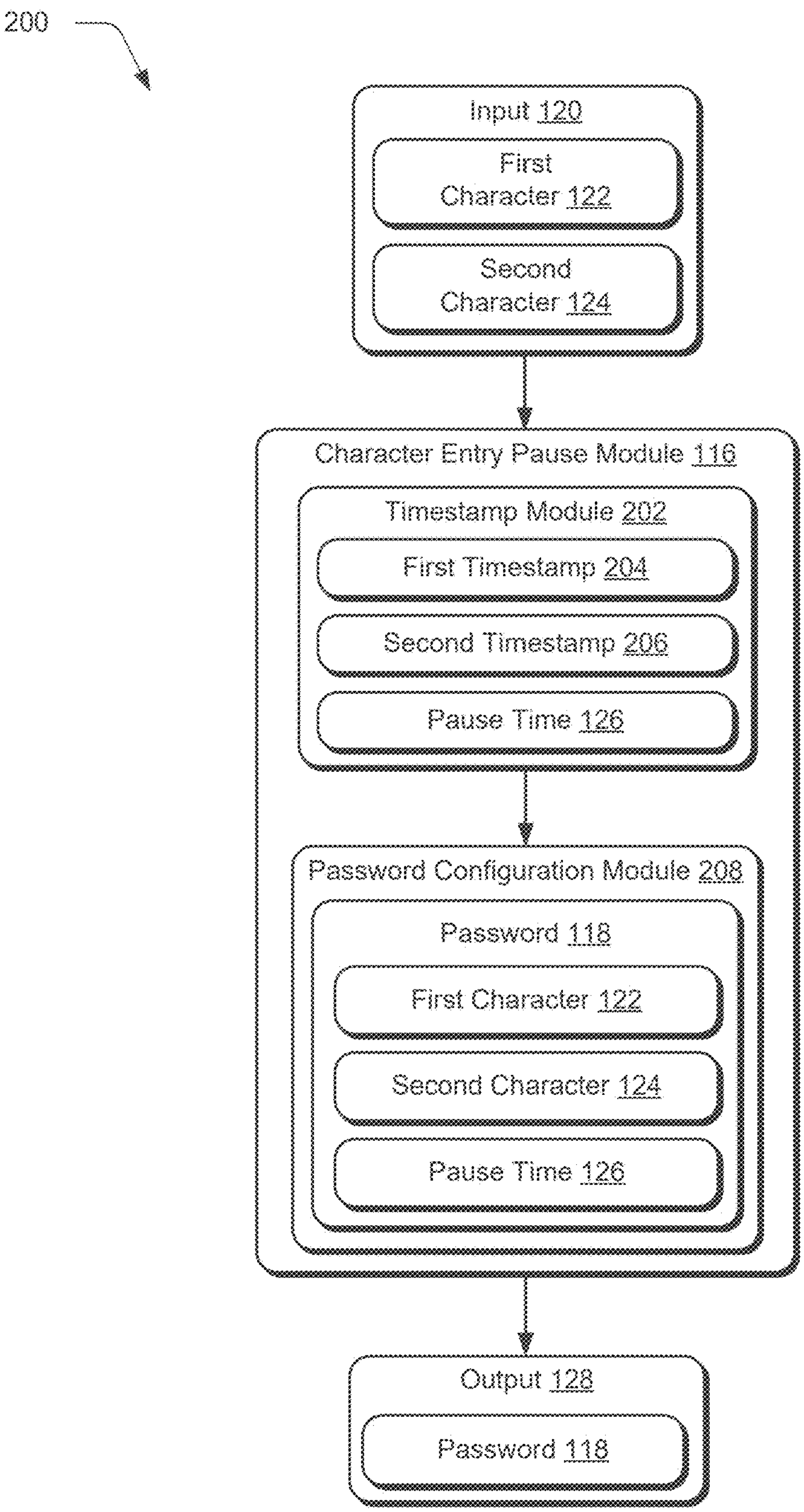
FIG. 2 depicts a system in an example implementation showing operation of a character entry pause module for character entry pause time for passwords.

FIG. 2 depicts a system 200 in an example implementation showing operation of the character entry pause module 116 of FIG. 1 in greater detail. The following discussion describes techniques that are implementable utilizing the previously described systems and devices. Aspects of each of the procedures are implemented in hardware, firmware, software, or a combination thereof. The procedures are shown as a set of blocks that specify operations performed and/or caused by one or more devices and are not necessarily limited to the orders shown for performing the operations by the respective blocks. In portions of the following discussion, reference is made to FIGS. 1-10.

To begin in this example, a character entry pause module 116 receives an input 120 including a first character 122 and a second character 124. For example, the input 120 and the first character 122 are entered via a keyboard or touch display. In some examples, the first character 122 and the second character 124 have corresponding timestamps indicating when the characters were entered on a keyboard.

The character entry pause module 116 includes a timestamp module 202 that determines a pause time 126 between the entry of the first character 122 and the entry of the second character 124. To do so, the timestamp module 202 first receives the first timestamp 204 and the second timestamp 206, which indicate actuation times of keyboard keys or other buttons corresponding to the first character 122 and the second character 124, respectively. The timestamp module 202 then compares the first timestamp 204 and the second timestamp 206, for example, by subtracting the second timestamp 206 from the first timestamp 204. The difference between the second timestamp 206 and the first timestamp 204 in this example corresponds to the pause time 126. The pause time 126, for instance, indicates an amount of time that passed between the entry of the first character 122 and the second character 124.

The character entry pause module 116 also includes a password configuration module 208. The password configuration module 208 receives the first character 122, the second character 124, and the pause time 126 from the timestamp module 202. The password configuration module 208 then generates a password 118 based on the first character 122, the second character 124, and the pause time 126. To do so, the password configuration module 208 generates a sequence including the first character 122, the pause time 126, and the second character 124. In some examples, the pause time 126 is indicated in the password 118 by a discrete length of time or a range of times. Additionally, in some examples the password 118 includes a buffer of time or preconfigured deviation time for actuation of the password, indicating an amount of time for pauses during subsequent entries of the password 118 deviate from the pause time 126.

The character entry pause module 116 then generates an output 128 including the password 118. For example, the password 118 is stored in the storage 108 of the computing device 102 for later recall during authentication of subsequently entered password attempts.

Figure 3:
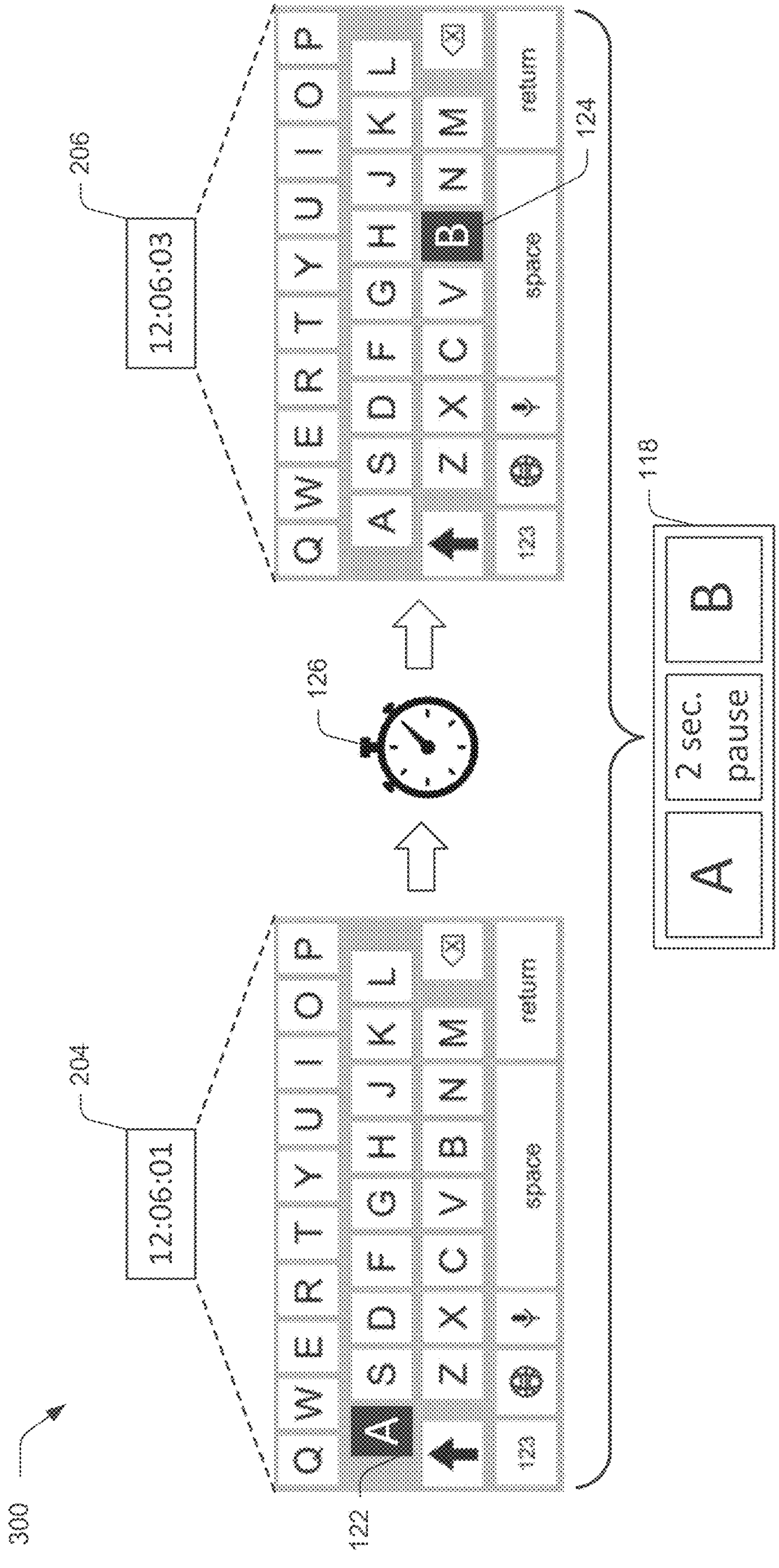
FIG. 3 depicts an example of storing a password including an indication of a pause time between entry of a first character and entry of a second character.
Figure 4:
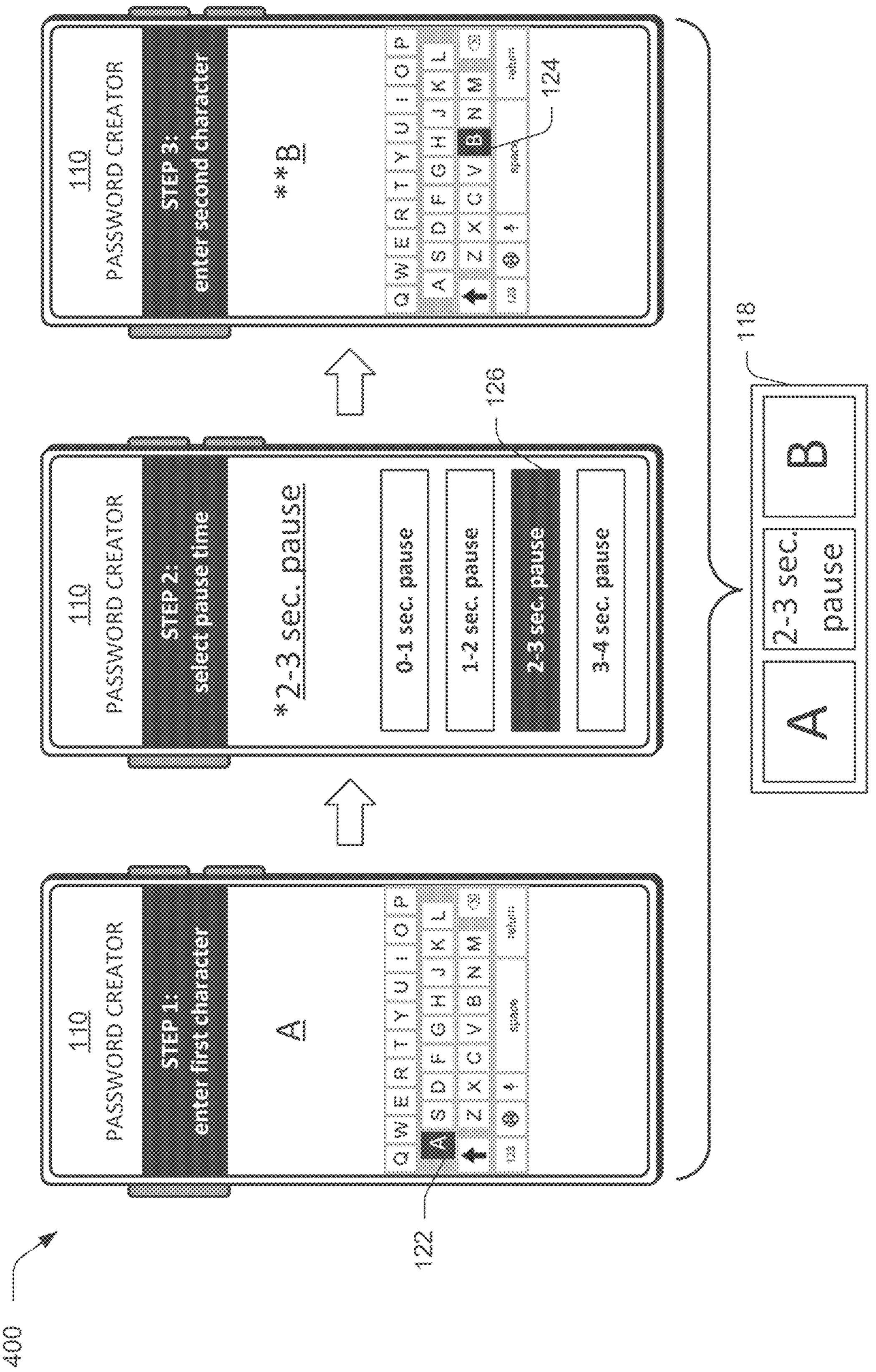
FIG. 4 depicts an example of storing a password including a manual entry of an indication of a pause time between entry of a first character and entry of a second character.
Figure 5:
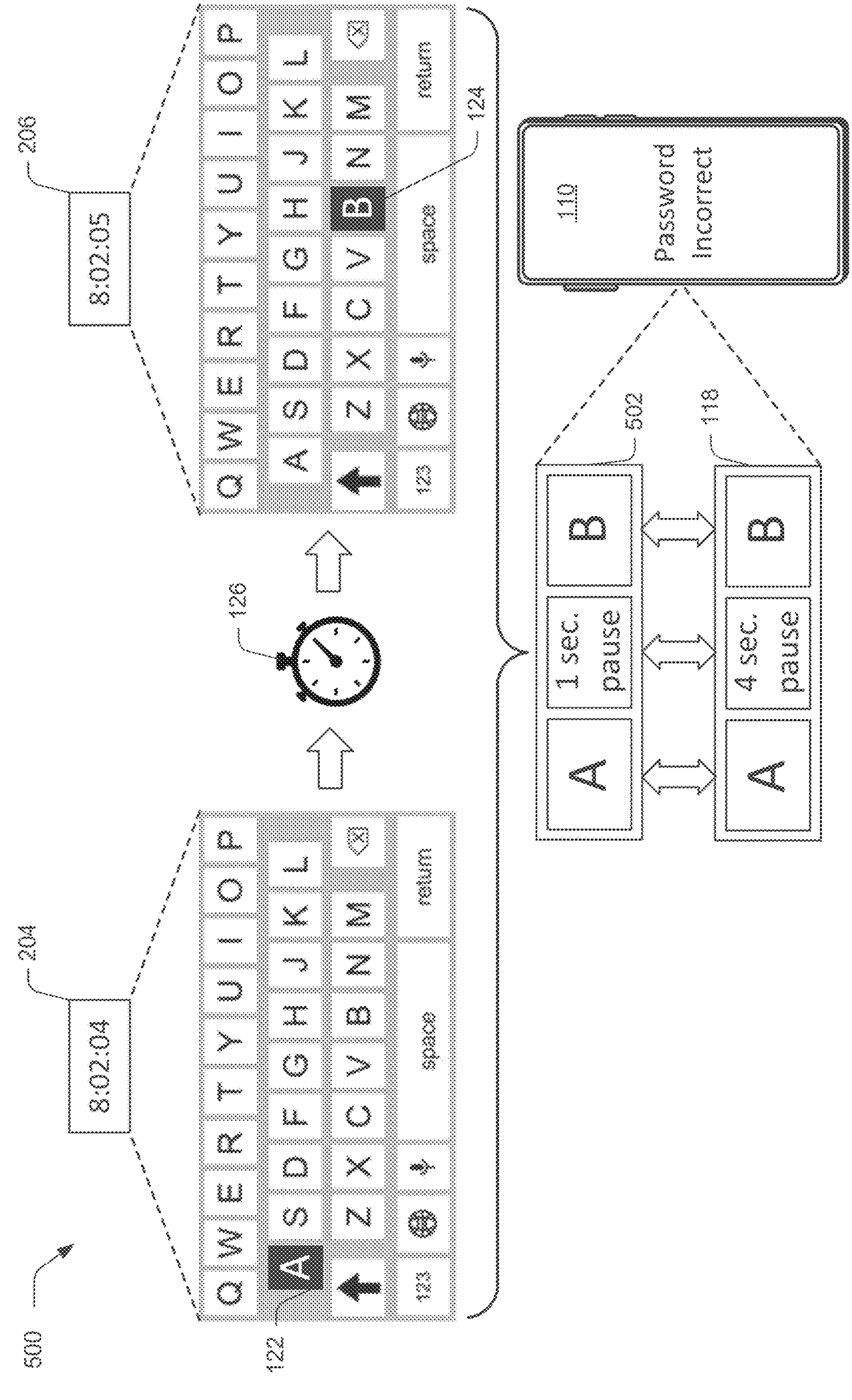
FIG. 5 depicts an example of authenticating a password including an indication of a pause time between entry of a first character and entry of a second character.

FIGS. 3-5 depict stages of character entry pause time for passwords. In some examples, the stages depicted in these figures are performed in a different order than described below.

FIG. 3 depicts an example 300 of storing a password including an indication of a pause time 126 between entry of a first character 122 and entry of a second character 124. As illustrated, the character entry pause module 116 receives a first character 122 and a second character 124, which are numbers, letters, or other glyphs corresponding to keys of a keyboard. The first character 122 and the second character 124, for instance, are entered in a specific order by a user via a webpage accessed from the computing device 102 or an application of the computing device 102. In this example, the first character 122 is a letter "A" and the second character 124 is a letter "B," which are entered as part of a password 118. The first character 122 and the second character 124 are entered via an analog keyboard a digital keyboard, or other character entry device, including a touch screen.

Because complex passwords have a higher level of security than simple alphanumeric passwords, a pause time 126 is incorporated into the password 118 to increase a level of complexity of the password 118. The pause time 126 corresponds to an amount of time that passes between entry of the first character 122 and the second character 124. The character entry pause module 116 includes a timestamp module 202 that determines the pause time 126 between the entry of the first character 122 and the entry of the second character 124. To do so, the timestamp module 202 receives a first timestamp 204 and a second timestamp 206 measured by the webpage, the application, or from a hardware component of the computing device 102. The first timestamp 204 indicates a time when the first character 122 was entered on a keyboard, and the second timestamp 206 indicates a time when the second character 124 was entered on the keyboard. In this example, the first timestamp 204 indicates the letter "A" was entered at 12:06:01, and the second timestamp 206 indicates the letter "B" was entered at 12:06:03.

The timestamp module 202 then compares the first timestamp 204 and the second timestamp 206, for example, by subtracting the second timestamp 206 from the first timestamp 204. The difference between the second timestamp 206 and the first timestamp 204 corresponds to the pause time 126. The pause time 126, for instance, indicates an amount of time that passed between the entry of the first character 122 and the second character 124. In this example, the timestamp module 202 subtracts 12:06:01 from 12:06:03, yielding the pause time 126 of 2 seconds.

The character entry pause module 116 uses a password configuration module 208 to generate a password 118 based on the pause time 126 between the entry of the first character 122 and the second character 124. To do this, the password configuration module 208 receives the first character 122, the second character 124, and the pause time 126 from the timestamp module 202. The password configuration module 208 then generates a password 118 based on the first character 122, the second character 124, and the pause time 126. To do so, the password configuration module 208 generates a sequence including the first character 122, the pause time 126, and the second character 124. In some examples, the pause time 126 is indicated in the password 118 by a discrete length of time or a range of times. In this example, the password 118 is "A," a 2 second pause, and "B."

Additionally, in some examples the password 118 includes a buffer of time or preconfigured deviation time for actuation of the password, indicating an amount of time for pauses during subsequent entries of the password 118 deviate from the pause time 126. For example, the password 118 alternatively includes "A," a 1-3 second pause, and "B." This sequence, for instance, allows for a pause time 126 of an increment of time between 1 and 3 seconds.

In some examples, the character entry pause module 116 incorporates the pause time 126 into an existing password. For example, an existing password includes the characters "A" and "B." After observing one or more entries of the existing password, the character entry pause module 116 determines an average pause time between entry of the characters of the password, or leverages a machine learning model to determine the average pause time. The character entry pause module 116 then incorporates the average pause time into the existing password. The character entry pause module 116 then observes subsequent entries of the existing password to determine whether the average pause time is present. If the average pause time is present, the subsequent entry of the existing password is authenticated. If the average pause time is not present, however, the subsequent entry of the existing password is not authenticated.

In some examples, the character entry pause module 116 determines a pause time 126 to authenticate a user identity without generating a password 118. For example, the character entry pause module 116 detects suspicious activity by determining a pause time 126 between character entry. Although the pause time 126 is not incorporated into the password 118 in this example, the character entry pause module 116 determines whether the password 118 or other information is entered too fast or too slow compared to observed activity of a user. For instance, the character entry pause module 116 observes one or more entries of the password 118, and determines the pause time 126 between entry of the characters of the password 118, or leverages a machine learning model to determine the pause time 126. The character entry pause module 116 then observes subsequent entries of the password 118 or entry of other content to determine whether the pause time 126 is present. If the pause time 126 is present, the subsequent entry of the password 118 is authenticated. If the pause time 126 time is not present, however, the subsequent entry of the password 118 is not authenticated. For instance, a pause time 126 that is shorter indicates that the password 118 was entered by a bot in some examples. Additionally, a pause time 126 that is longer indicates that the password 118 was entered by a third party attempting to replicate the password 118. The character entry pause module 116 therefore identifies suspicious activity regarding the password 118 by comparing the pause time 126 observed during one or more prior password entries to the pause time 126 determined from a subsequent password entry.

FIG. 4 depicts an example 400 of storing a password 118 including a manual entry of an indication of a pause time 126 between entry of a first character 122 and entry of a second character 124. As illustrated, the character entry pause module 116 receives a first character 122 and a second character 124, which are numbers, letters, or other glyphs corresponding to keys of a keyboard. For example, the first character 122 and the second character 124 are received in response to a prompt to create a password 118. The first character 122 and the second character 124, for instance, are entered in a specific order by a user. In this example, the first character 122 is a letter "A" and the second character 124 is a letter "B," which are entered as part of the password 118. The first character 122 and the second character 124 are entered via an analog keyboard a digital keyboard, or other character entry device, including a touch screen.

To increase a level of complexity of the password 118, the character entry pause module 116 also receives a pause time 126 corresponding to an amount of time between entry of the first character 122 and the second character 124. In this example, the pause time 126 is manually selected. The character entry pause module 116 generates a prompt, for instance, allowing a user to select or otherwise entered the pause time 126, which is a discrete time or a range of times. As illustrated, the character entry pause module 116 receives an indication of the pause time 126 of 2-3 seconds, selected from a list of multiple optional pause times. Therefore, although the pause time 126 is not determined based on an actual entry time between the first character 122 and the second character 124 in this example, the pause time 126 is manually selected for incorporation into the password 118.

The character entry pause module 116 then generates a password 118 based on the pause time 126 between the entry of the first character 122 and the second character 124. To do this, the password configuration module 208 generates a sequence including the first character 122, the pause time 126, and the second character 124. In some examples, the pause time 126 is indicated in the password 118 by a discrete length of time or a range of times. In this example, the password 118 is "A," a 2-3 second pause, and "B." This sequence, for instance, allows for a pause time 126 of an increment of time between 2 and 3 seconds.

Alternatively, in some examples the character entry pause module 116 receives an entry corresponding to predetermined ranges of pause times. For instance, a pause time 126 of "short" corresponds to 0-1.99 seconds, a pause time 126 of "medium" corresponds to 2-3.99 seconds, and a pause time 126 of "long" corresponds to 4+ seconds, or any other combination of time increments.

FIG. 5 depicts an example 500 of authenticating a password including an indication of a pause time between entry of a first character and entry of a second character. As illustrated, the character entry pause module 116 receives an entered password 502 that is part of an attempt to access controlled content, the entered password 502 including a first character 122 and a second character 124, which are numbers, letters, or other glyphs corresponding to keys of a keyboard. For example, the entered password 502 is received in response to a prompt to enter a password 118. The first character 122 and the second character 124, for instance, are entered in a specific order by a user. In this example, the first character 122 is a letter "A" and the second character 124 is a letter "B," which are entered as part of a password 118. The first character 122 and the second character 124 are entered via an analog keyboard a digital keyboard, or other character entry device, including a touch screen, as shown in FIG. 5.

While the entered password 502 is entered, a pause time 126 corresponds to an amount of time between entry of the first character 122 and the second character 124. The character entry pause module 116 includes a timestamp module 202 that determines the pause time 126 between the entry of the first character 122 and the entry of the second character 124. To do so, the timestamp module 202 receives a first timestamp 204 and a second timestamp 206. The first timestamp 204 indicates a time when the first character 122 was entered on a keyboard, and the second timestamp 206 indicates a time when the second character 124 was entered on the keyboard. In this example, the first timestamp 204 indicates the letter "A" was entered at 8:02:04, and the second timestamp 206 indicates the letter "B" was entered at 8:02:05. The first timestamp 204 and the second timestamp 206, for instance, are measured and collected from a webpage, a password manager application, or other software application.

The timestamp module 202 then compares the first timestamp 204 and the second timestamp 206, for example, by subtracting the second timestamp 206 from the first timestamp 204. The difference between the second timestamp 206 and the first timestamp 204 in this example corresponds to the pause time 126. The pause time 126, for instance, indicates an amount of time that passed between the entry of the first character 122 and the second character 124. In this example, the timestamp module 202 subtracts 8:02:04 from 8:02:05, yielding the pause time 126 of 1 second.

To authenticate the entered password 502, the entered password is compared to the password 118 that is stored or otherwise associated with the computing device 102 or an application involves the password 118 to access the controlled content. In this example, the entered password 502 and the password 118 include the first character 122 and the second character 124, which are identical. However, the pause time 126 corresponding to the entered password 502 is 1 second, and the pause time 126 corresponding to the password 118 is 4 seconds. Therefore, the character entry pause module 116 denies access to the controlled content and displays an indication of an incorrect password in the user interface 110. Otherwise, if the pause time 126 corresponding to the entered password 502 matches the pause time 126 corresponding to the password, the character entry pause module 116 permits access to the controlled content.

In some examples, the character entry pause system leverages a machine learning model to identify suspicious entry of the password 118 or other information. Because keystroke speed is a unique behavior, the machine learning model is trained on pause times between previous character entries by a user, which is explained in further detail with respect to FIG. 6. The character entry pause module 116 then uses the machine learning model to determine whether subsequent entries on the user's device or to the user's account were made by the user by comparing pause times in the subsequent entries to the pause time previous character entries by the user. The character entry pause module 116 therefore generates user alerts indicating, for example, that pause times that are shorter than prior pause times indicate the entry was made by an internet bot, or that pause times that are longer than prior pause times indicate the entry was made by a third party attempting to replicate the user's password or other personal information.

Figure 6:
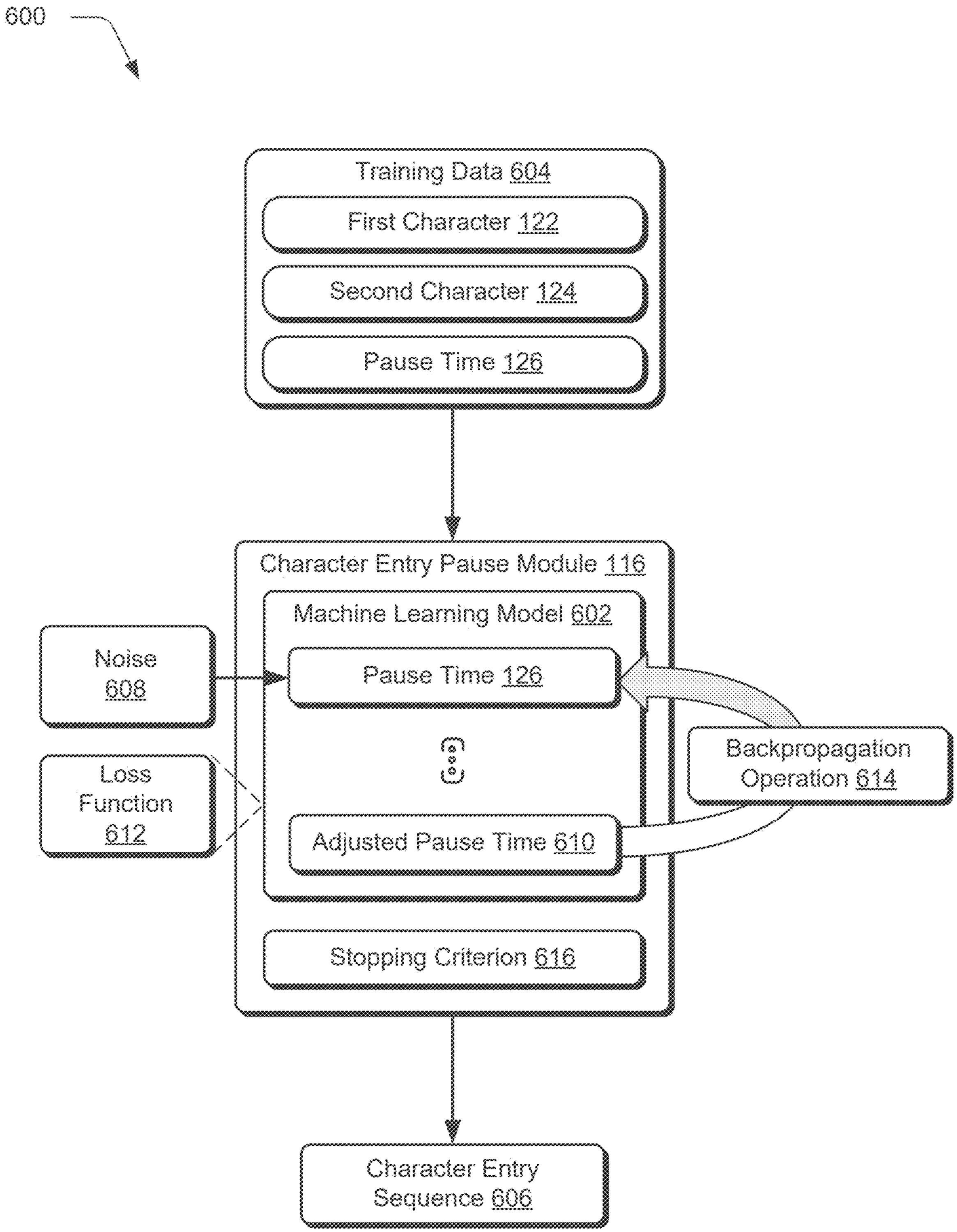
FIG. 6 depicts a system in an example implementation showing training of a machine learning model for character entry pause time in greater detail.

FIG. 6 depicts a system 600 in an example implementation showing training of a machine learning model 602 in greater detail. The machine learning model 602 is illustrated as implemented as part of the character entry pause module 116. The machine learning model 602 is representative of functionality to generate training data 604, use the training data 604 to generate a character entry sequence 606, and/or implement the functionality described herein for character entry pause time.

As described herein, the machine learning model 602 refers to a computer representation that is tunable (e.g., through training and retraining) based on entries without being actively programmed by a user to approximate unknown functions, automatically and without user intervention. In particular, the machine learning model 602 includes a model that utilizes algorithms to learn from, and make predictions on, known data by analyzing training data to learn and relearn to generate outputs that reflect patterns and attributes of the training data. Examples of machine learning models include neural networks, convolutional neural networks (CNNs), long short-term memory (LSTM) neural networks, generative adversarial networks (GANs), decision trees, support vector machines, linear regression, logistic regression, Bayesian networks, random forest learning, dimensionality reduction algorithms, boosting algorithms, deep learning neural networks, and so forth. The machine learning model 602 is configured using a plurality of layers. The plurality of layers are configurable to include an input layer, an output layer, and one or more hidden layers. Calculations are performed involving noise diffusion within the layers via hidden states through a system of weighted connections that are "learned" during training of the machine learning model 602 to output a character entry sequence 606 conditioned on embeddings of the training data 604.

As noted above, to train the machine learning model 602, training data 604 is received that provides examples of "what is to be learned" by the machine learning model 602 (i.e., as a basis to learn how a pause time 126 is formed using random character entry). During training, a pause time 126 is entered to the machine learning model 602. For example, the pause time 126 is a calculated difference in time between entry of a first character 122 and a second character 124. Noise 608 is incorporated into the pause time 126, resulting in an adjusted pause time 610. The machine learning model 602 then predicts correspondences between the pause time 126 and entered characters, including the first character 122 and the second character 124.

Training of the machine learning model 602 includes calculating a loss function 612 to quantify a loss associated with operations performed by the machine learning model 602. Calculating the loss function 612, for instance, includes comparing a difference between the pause time 126 and the adjusted pause time 610, which is a ground truth. The loss function 612 is configurable in a variety of ways, examples of which include regret, Quadratic loss function as part of a least squares technique, perceptual loss using a pre-trained convolutional neural network, and so forth.

Calculating the loss function 612 also includes use of a backpropagation operation 614 as part of minimizing the loss function 612 and thereby training parameters of the machine learning model 602. Minimizing the loss function 612, for instance, includes adjusting weights corresponding to the noise 608 to minimize the loss and thereby optimize performance of the machine learning model 602. The adjustment is determined by computing a gradient of the loss function 612, which indicates a direction to be used in order to adjust the parameters to minimize the loss. The parameters of the machine learning model 602 are then updated based on the computed gradient.

This process of training the machine learning model 602 continues over a plurality of iterations in an example until satisfying one or more stopping criterion 616. The stopping criterion 616 is employed by the character entry pause module 116 in this example to reduce overfitting of the machine learning model 602, reduce computational resource consumption, and promote an ability of the machine learning model 602 to address previously unseen data (e.g., data that is not included specifically as an example in the training data 604). Examples of a stopping criterion 616 include but are not limited to a predefined number of epochs, validation loss stabilization, achievement of a performance improvement threshold, or based on performance metrics such as precision and recall. In this example, the backpropagation operation 614 continues training the machine learning model 602 until the adjusted pause time 610 converges with the pause time 126.

Example Procedures

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-10.

Figure 7:
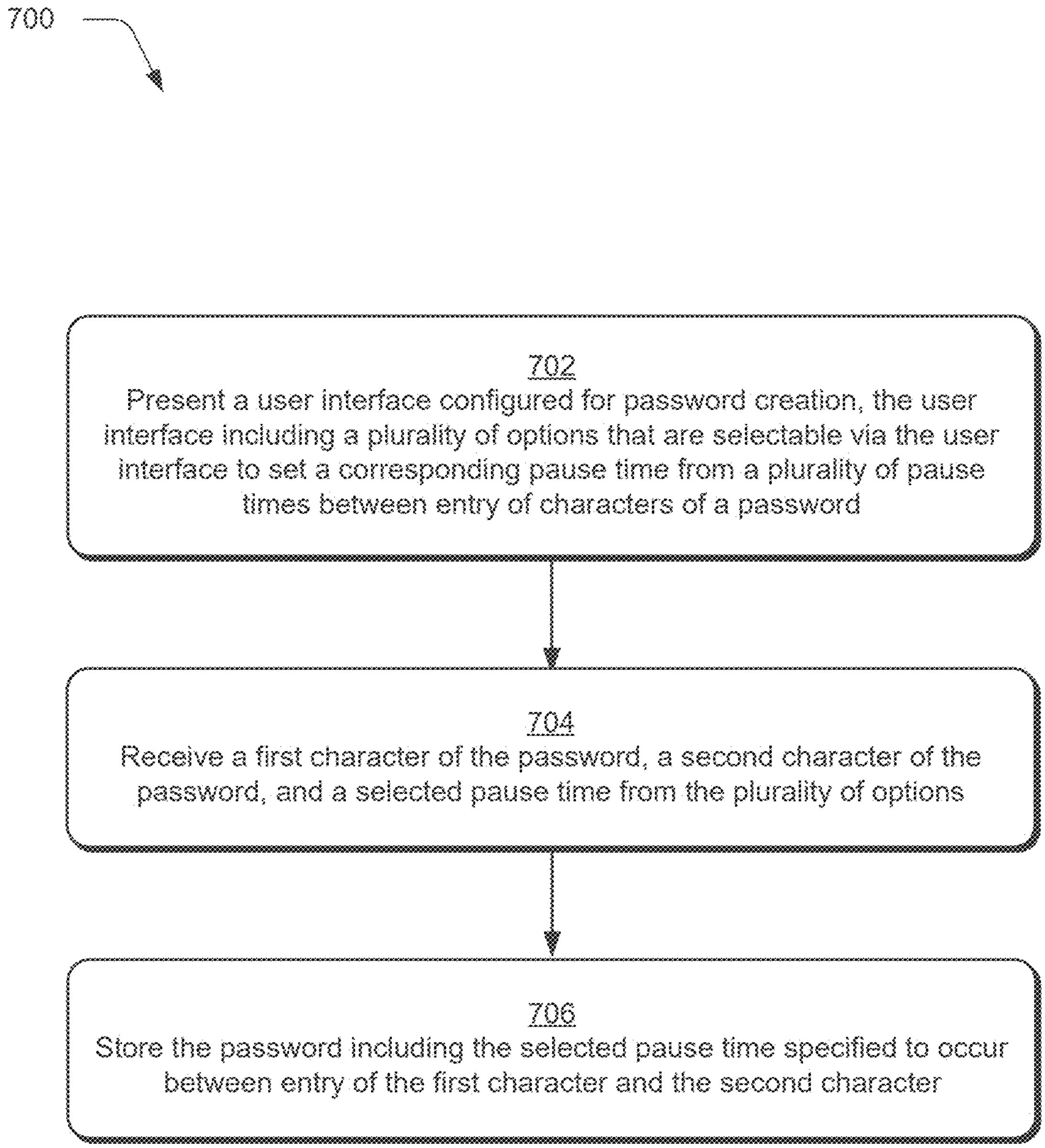
FIG. 7 depicts a procedure in an example implementation of character entry pause time for passwords.

FIG. 7 depicts a procedure 700 in an example implementation of character entry pause time for passwords. At block 702 a user interface 110 configured for password creation is presented, the user interface 110 including a plurality of options that are selectable via the user interface 110 to set a corresponding pause time from a plurality of pause times between entry of characters of a password 118. In some examples, the plurality of pause times indicate consecutive ranges of pause times between the entry of the characters of the password 118.

At block 704, a first character 122 of the password 118, a second character 124 of the password 118, and a selected pause time from the plurality of options are received. In some examples, the selected pause time corresponds to a range of time. For example, the selected pause time indicates an amount of time between actuation times of keys on a keyboard. Some examples further comprise using a machine learning model 602 to associate the selected pause time with a user. In some examples, the selected pause time includes a time buffer for authentication of the password 118 including the selected pause time.

At block 706, the password 118 is stored, including the selected pause time specified to occur between entry of the first character 122 and the second character 124. In some examples, the password 118 is a coded sequence indicating the selected pause time specified to occur between the entry of the first character 122 and the second character 124. Some examples further comprise comparing a pause time between entry of at least two characters to the selected pause time of the password 118. Additionally or alternatively, some examples further comprise receiving an additional entry including an adjusted selected pause time between the entry of the first character 122 and the entry of the second character 124 and adjusting the password 118 based on the additional entry.

Figure 8:
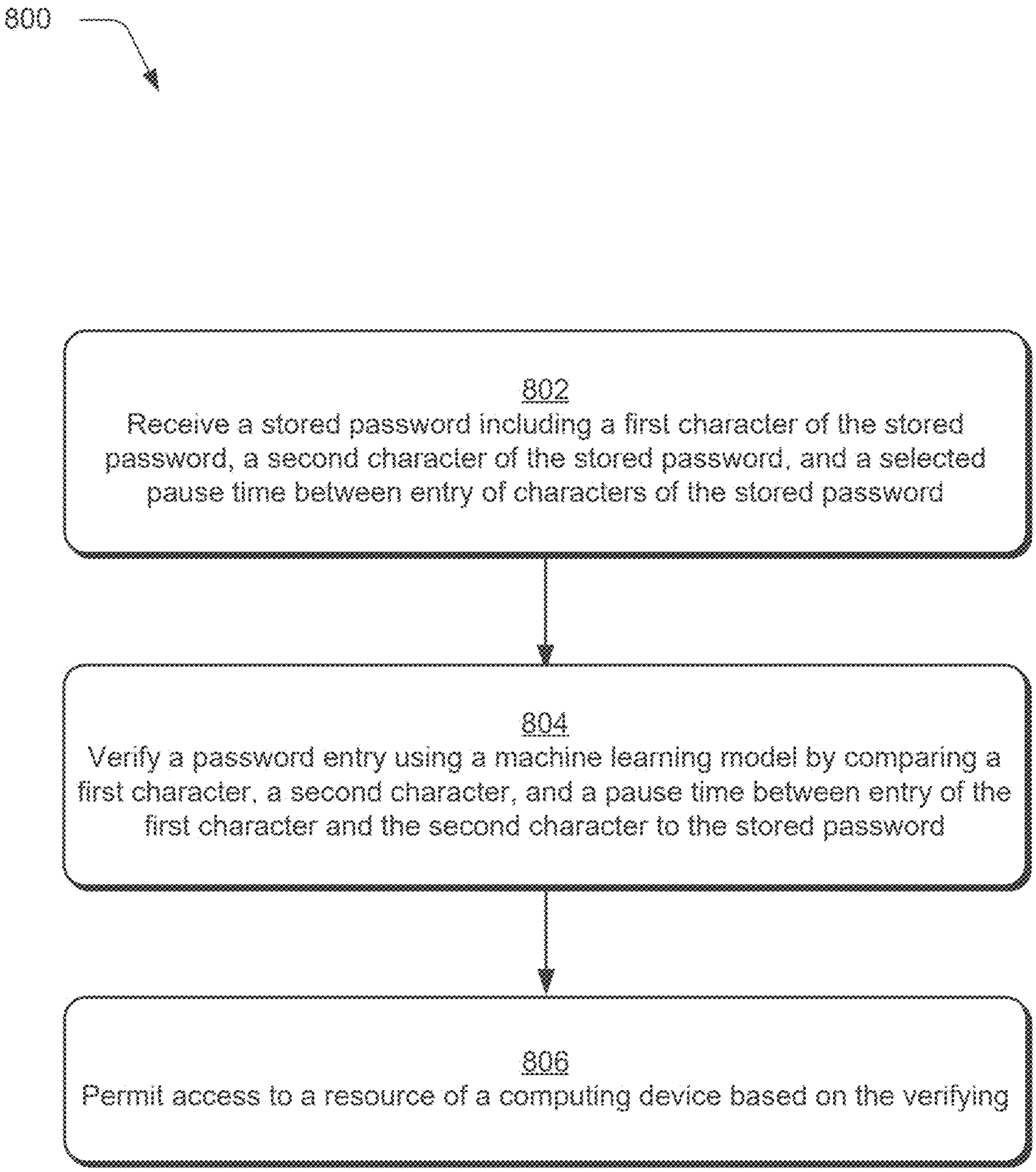
FIG. 8 depicts a procedure in an additional example implementation of character entry pause time for passwords.

FIG. 8 depicts a procedure 800 in an additional example implementation of character entry pause time for passwords. At block 802, a stored password is received including a first character 122 of the stored password, a second character 124 of the stored password, and a selected pause time between entry of characters of the stored password. In some examples, the selected pause time corresponds to a range of time. For example, the selected pause time indicates an amount of time between actuation times of keys on a keyboard. In some examples, the stored password is a coded sequence indicating the selected pause time specified to occur between the entry of the first character 122 and the second character 124. In some examples, the selected pause time includes a time buffer for authentication of the stored password including the selected pause time.

At block 804, a password entry is verified using a machine learning model 602 by comparing a first character 122, a second character 124, and a pause time between entry of the first character 122 and the second character 124 to the stored password. For example, comparing the pause time between the entry of the first character 122 and the second character 124 to the selected pause time of the stored password.

At block 806, access to a resource of a computing device is permitted based on the verifying. Some examples further comprise receiving an additional entry including an adjusted selected pause time between the entry of the first character 122 and the entry of the second character 124 and adjusting the stored password based on the additional entry.

Figure 9:
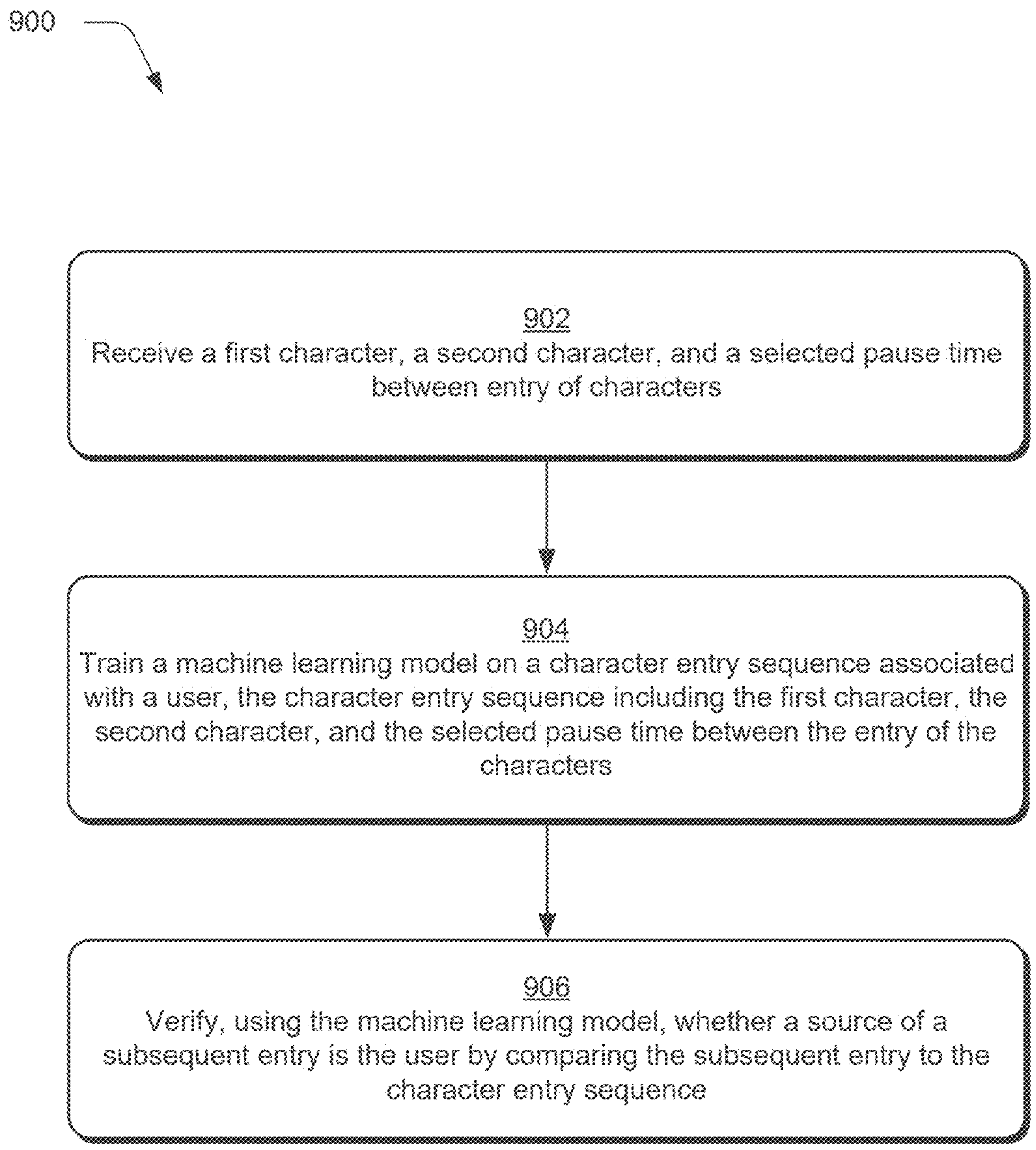
FIG. 9 depicts a procedure in an additional example implementation of character entry pause time for passwords.

FIG. 9 depicts a procedure 900 in an additional example implementation of character entry pause time for passwords.

At block 902, a first character 122, a second character 124, and a selected pause time between entry of characters are received. For example, the selected pause time corresponds to a range of time. In some examples, the selected pause time indicates an amount of time between actuation times of keys on a keyboard.

At block 904, a machine learning model 602 is trained on a character entry sequence associated with a user, the character entry sequence including the first character 122, the second character 124, and the selected pause time between the entry of the characters. Some examples further comprise using the machine learning model 602 to associate the selected pause time with the user.

At block 906, whether a source of a subsequent entry is the user is verified using the machine learning model 602 by comparing the subsequent entry to the character entry sequence. Additionally or alternatively, some examples further comprise receiving an additional entry including an adjusted selected pause time between the entry of the first character 122 and the entry of the second character 124 and adjusting the selected pause time based on the additional entry.

Example System and Device

Figure 10:
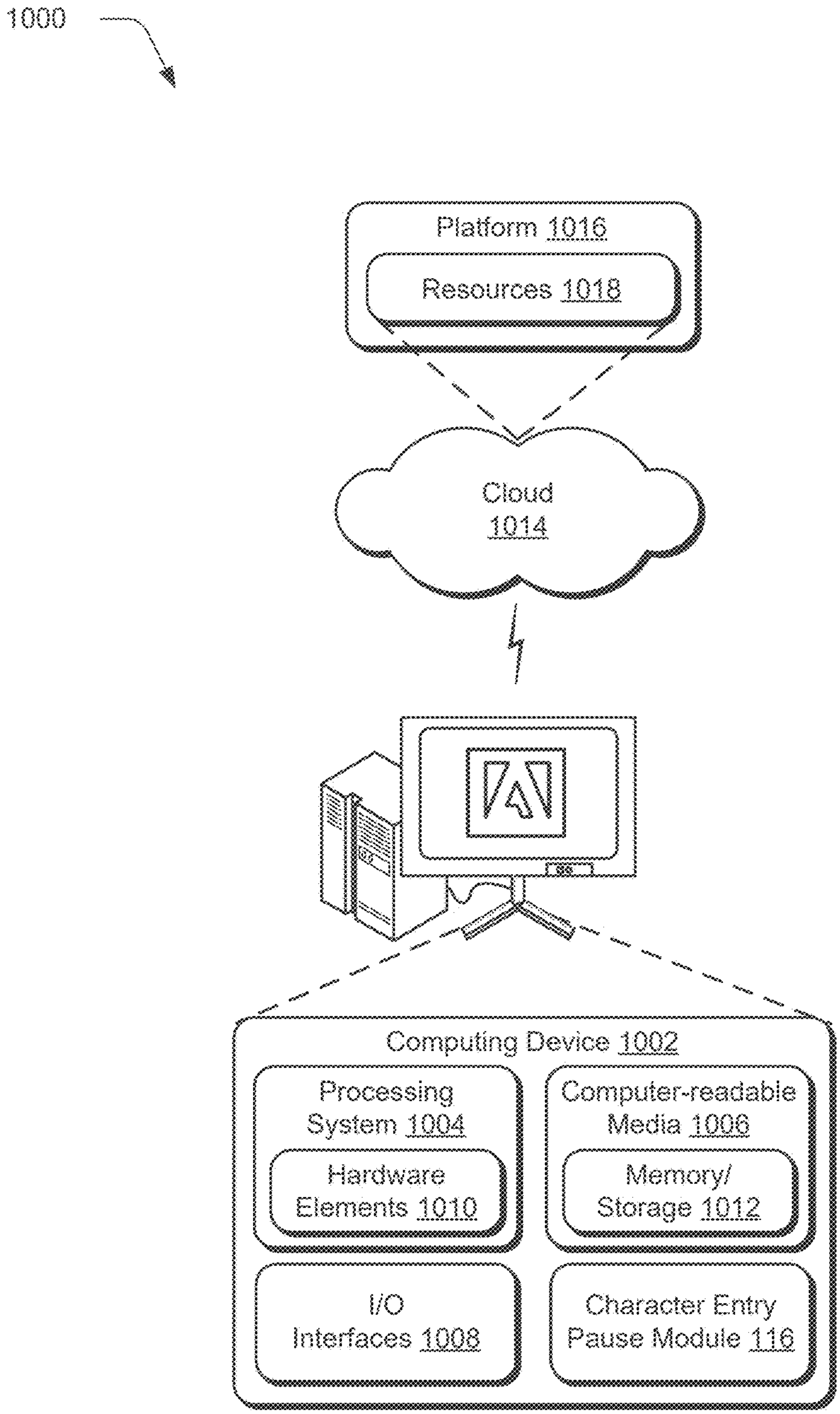
FIG. 10 illustrates an example system including various components of an example device that can be implemented as any type of computing device as described and/or utilized with reference to FIGS. 1-9 to implement embodiments of the techniques described herein.

FIG. 10 illustrates an example system generally at 1000 that includes an example computing device 1002 that is representative of one or more computing systems and/or devices that implement the various techniques described herein. This is illustrated through inclusion of the character entry pause module 116. The computing device 1002 is configurable, for example, as a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interface 1008 that are communicatively coupled, one to another. Although not shown, the computing device 1002 further includes a system bus or other data and command transfer system that couples the various components, one to another. A system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware element 1010 that is configurable as processors, functional blocks, and so forth. This includes implementation in hardware as an application specific integrated circuit or other logic device formed using one or more semiconductors. The hardware elements 1010 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1006 is illustrated as including memory/storage 1012. The memory/storage 1012 represents memory/storage capacity associated with one or more computer-readable media. The memory/storage 1012 includes volatile media (such as random access memory (RAM)) and/or nonvolatile media (such as read only memory (ROM), Flash memory, optical disks, magnetic disks, and so forth). The memory/storage 1012 includes fixed media (e.g., RAM, ROM, a fixed hard drive, and so on) as well as removable media (e.g., Flash memory, a removable hard drive, an optical disc, and so forth). The computer-readable media 1006 is configurable in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1002. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1002, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 1010. The computing device 1002 is configured to implement particular instructions and/or functions corresponding to the software and/or hardware modules. Accordingly, implementation of a module that is executable by the computing device 1002 as software is achieved at least partially in hardware, e.g., through use of computer-readable storage media and/or hardware elements 1010 of the processing system 1004. The instructions and/or functions are executable/operable by one or more articles of manufacture (for example, one or more computing devices and/or processing systems 1004) to implement techniques, modules, and examples described herein.

The techniques described herein are supported by various configurations of the computing device 1002 and are not limited to the specific examples of the techniques described herein. This functionality is also implementable through use of a distributed system, such as over a "cloud" 1114 via a platform 1016 as described below.

The cloud 1014 includes and/or is representative of a platform 1016 for resources 1018. The platform 1016 abstracts underlying functionality of hardware (e.g., servers) and software resources of the cloud 1014. The resources 1018 include applications and/or data that can be utilized when computer processing is executed on servers that are remote from the computing device 1002. Resources 1018 can also include services provided over the Internet and/or through a subscriber network, such as a cellular or Wi-Fi network.

The platform 1016 abstracts resources and functions to connect the computing device 1002 with other computing devices. The platform 1016 also serves to abstract scaling of resources to provide a corresponding level of scale to encountered demand for the resources 1018 that are implemented via the platform 1016. Accordingly, in an interconnected device embodiment, implementation of functionality described herein is distributable throughout the system 1000. For example, the functionality is implementable in part on the computing device 1002 as well as via the platform 1016 that abstracts the functionality of the cloud 1014.

What is claimed is:

1. A method comprising:

presenting, by a processing device, a user interface configured for password creation, the user interface including a plurality of options that are selectable via the user interface to set a corresponding pause time between entry of characters of a password, the plurality of options including at least three different options that each indicate a range of time to incorporate as the corresponding pause time between the entry of two of the characters of the password;

receiving, by the processing device, a first character of the password, a second character of the password, and a selected pause time from the plurality of options; and storing, by the processing device, the password including an encoding representing the selected pause time specified to occur between entry of the first character and the second character.

2. The method of claim 1, wherein the selected pause time corresponds to a range of seconds between entry of the first character of the password and the second character of the password.

3. The method of claim 1, further comprising using a machine learning model to associate the selected pause time with a user.

4. The method of claim 1, wherein the selected pause time indicates an amount of time between actuation times of keys on a keyboard.

5. The method of claim 1, wherein the password is a coded sequence indicating the selected pause time specified to occur between the entry of the first character and the second character.

6. The method of claim 1, further comprising comparing a pause time between entry of at least two characters to the selected pause time of the password.

7. The method of claim 1, further comprising receiving an additional entry including an adjusted selected pause time between the entry of the first character and the entry of the second character and adjusting the password based on the additional entry.

8. The method of claim 1, wherein the plurality of options indicate consecutive ranges of pause times between the entry of the characters of the password.

9. The method of claim 1, wherein the selected pause time includes a time buffer for authentication of the password including the selected pause time.

10. A system comprising:

a memory component; and a processing device coupled to the memory component, the processing device to perform operations comprising:

receiving a stored password including a first character of the stored password, a second character of the stored password, and a selected pause time between entry of characters of the stored password that is selected from a plurality of options, the plurality of options including at least three different options that each indicate a range of time to incorporate as a corresponding pause time between the entry of two of the characters of the stored password, the stored password stored as an encoding representing the selected pause time specified to occur between entry of the first character and the second character;

verifying a password entry using a machine learning model by comparing a first character, a second character, and a pause time between entry of the first character and the second character to the stored password; and permitting access to a resource of a computing device based on the verifying.

11. The system of claim 10, wherein the selected pause time corresponds to a range of seconds between entry of the characters of the stored password.

12. The system of claim 10, wherein the selected pause time indicates an amount of time between actuation times of keys on a keyboard.

13. The system of claim 10, wherein the stored password is a coded sequence indicating the selected pause time specified to occur between the entry of the first character and the second character.

14. The system of claim 10, further comprising comparing the pause time between the entry of the first character and the second character to the selected pause time of the stored password.

15. The system of claim 14, further comprising receiving an additional entry including an adjusted selected pause time between the entry of the first character and the entry of the second character and adjusting the stored password based on the additional entry.

16. The system of claim 10, wherein the selected pause time includes a time buffer for authentication of the stored password including the selected pause time.

17. A non-transitory computer-readable storage medium storing executable instructions, which when executed by a processing device, cause the processing device to perform operations comprising:

receiving a first character, a second character, and a selected pause time between entry of characters from a plurality of options that are selectable via a user interface to set a corresponding pause time between entry of characters of a password, the plurality of options including at least three different options that each indicate a range of time to incorporate as the corresponding pause time between the entry of two of the characters of the password;

training a machine learning model on a character entry sequence associated with a user, the character entry sequence stored as an encoding representing the first character, the second character, and the selected pause time between the entry of the characters; and verifying, using the machine learning model, whether a source of a subsequent entry is the user by comparing the subsequent entry to the character entry sequence.

18. The non-transitory computer-readable storage medium of claim 17, wherein the selected pause time corresponds to a range of seconds between entry of the first character of the password and the second character of the password.

19. The non-transitory computer-readable storage medium of claim 17, further comprising using the machine learning model to associate the selected pause time with the user.

20. The non-transitory computer-readable storage medium of claim 17, wherein the selected pause time indicates an amount of time between actuation times of keys on a keyboard.

* * * * *